(12) United States Patent
Asano et al.

(10) Patent No.: US 11,604,999 B2
(45) Date of Patent: Mar. 14, 2023

(54) LEARNING DEVICE, LEARNING METHOD, AND COMPUTER PROGRAM PRODUCT

(71) Applicant: KABUSHIKI KAISHA TOSHIBA, Minato-ku (JP)

(72) Inventors: Wataru Asano, Yokohama (JP); Akiyuki Tanizawa, Kawasaki (JP); Atsushi Yaguchi, Taito (JP); Shuhei Nitta, Ota (JP); Yukinobu Sakata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 318 days.

(21) Appl. No.: 16/801,233

(22) Filed: Feb. 26, 2020

(65) Prior Publication Data

US 2021/0034983 A1 Feb. 4, 2021

(30) Foreign Application Priority Data

Jul. 31, 2019 (JP) .............................. JP2019-141160

(51) Int. Cl.
*G06N 3/08* (2006.01)
*G06N 3/04* (2006.01)
*G06N 3/084* (2023.01)

(52) U.S. Cl.
CPC ........... *G06N 3/084* (2013.01); *G06N 3/0454* (2013.01)

(58) Field of Classification Search
CPC .............................. G06N 3/084; G06N 3/0454
See application file for complete search history.

(56) References Cited

U.S. PATENT DOCUMENTS

2018/0293710 A1* 10/2018 Meyer .................... G06T 5/002
2019/0034781 A1   1/2019 Asano et al.
2020/0034703 A1*  1/2020 Fukuda ................... G06N 3/08

FOREIGN PATENT DOCUMENTS

JP    2019-028746 A    2/2019

OTHER PUBLICATIONS

Hinton et al., "Distilling the Knowledge in a Neural Network", arXiv: 1503.02531, Mar. 9, 2015, 9 pages.
Simonyan et al., "Deep Inside Convolutional Networks: Visualising Image Classification Models and Saliency Maps", arXiv: 1312.6034, Apr. 19, 2014, 8 pages.

* cited by examiner

*Primary Examiner* — Brandon J Miller
(74) *Attorney, Agent, or Firm* — Oblon, McClelland, Maier & Neustadt, L.L.P.

(57) ABSTRACT

A learning device according to an embodiment includes one or more hardware processors configured to function as a generation unit, an inference unit, and a training unit. The generation unit generates input data with which an error between a value output from each of one or more target nodes and a preset aimed value is equal to or less than a preset value, the target nodes being in a target layer of a plurality of layers included in a first neural network. The inference unit causes the input data to propagate in a forward direction of the first neural network to generate output data. The training unit trains a second neural network differing from the first neural network by using training data including a set of the input data and the output data.

14 Claims, 8 Drawing Sheets

LEARNING DEVICE, LEARNING METHOD, AND COMPUTER PROGRAM PRODUCT

CROSS-REFERENCE TO RELATED APPLICATIONS

This application is based upon and claims the benefit of priority from Japanese Patent Application No. 2019-141160, filed on Jul. 31, 2019; the entire contents of which are incorporated herein by reference.

FIELD

Embodiments described herein relate generally to a learning device, a learning method, and a computer program product.

BACKGROUND

In recent years, neural networks have been applied to various tasks such as image recognition, image processing, speech recognition, translation, and summarization. The neural networks need to upsize a configuration to achieve high performance. However, the neural network having a larger configuration has a relatively low computing capability, and it has been difficult to execute the neural network on an edge system or the like for vehicles, smartphones, IoT devices, or the like which have severe restrictions on power consumption. Therefore, to operate the neural network in the edge system or the like, a designer needs to design a neural network configured as small as possible.

For example, as a method for downsizing the configuration of the neural network, learning with knowledge distillation is known which trains a neural network with a smaller configuration by using, as teacher data, output data from a neural network with a larger configuration. However, in a case of performing the learning, if input data having used for learning the neural network with a larger configuration cannot be used, the designer needs to prepare a large amount of input data, resulting in increased workload for collecting data.

DETAILED DESCRIPTION

A learning device according to an embodiment includes one or more hardware processors configured to function as a generation unit, an inference unit, and a training unit. The generation unit generates input data with which an error between a value output from each of one or more target nodes and a preset aimed value is equal to or less than a preset value, the target nodes being in a target layer of a plurality of layers included in a first neural network. The inference unit causes the input data to propagate in a forward direction of the first neural network to generate output data. The training unit trains a second neural network differing from the first neural network by using training data including a set of the input data and the output data. Embodiments will be described below in detail with reference to the drawings. A learning device 10 according to the present embodiment is configured to train a student neural network (second neural network) configured to perform the same task as a learned teacher neural network (first neural network), with reduced workload.

First Embodiment

Figure 1:
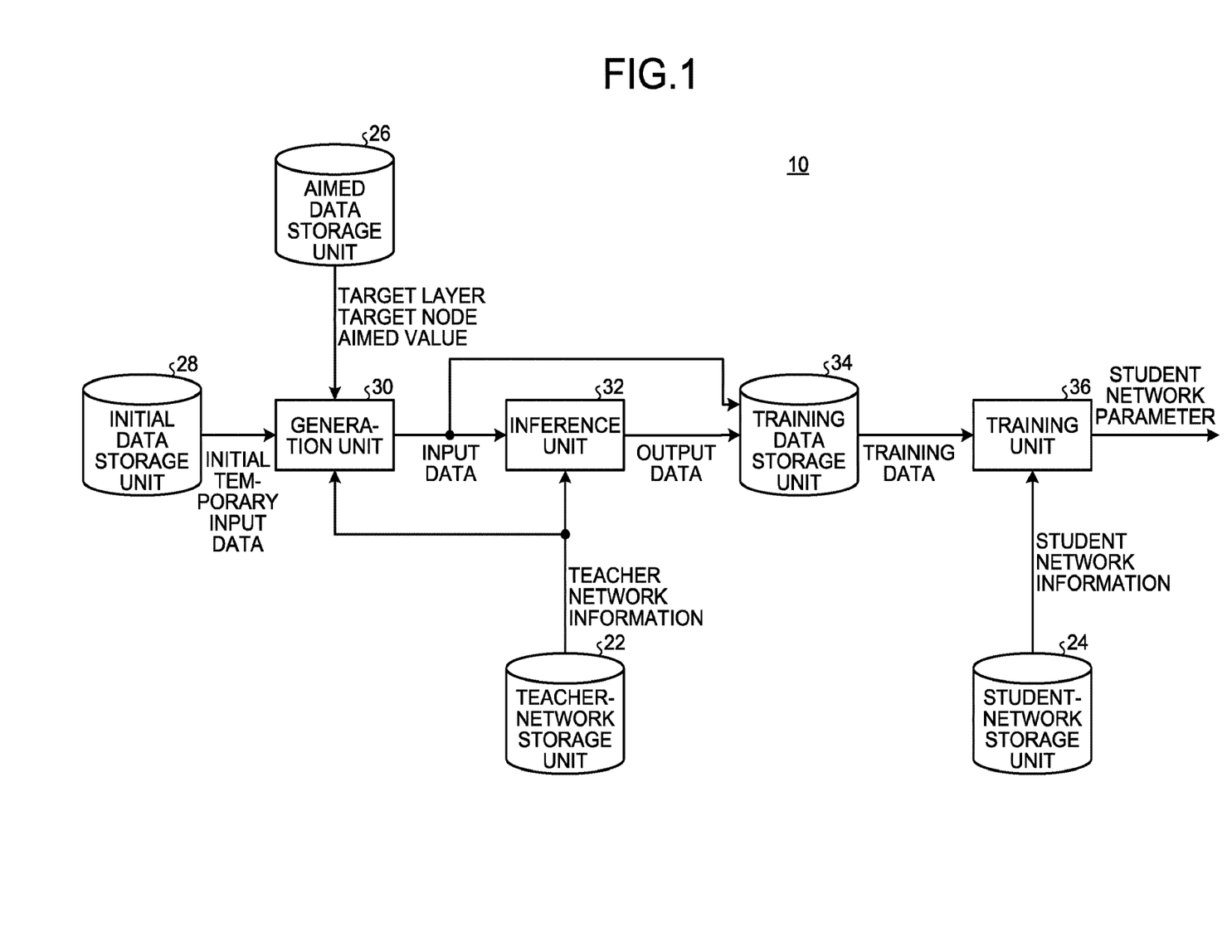
FIG. 1 is a diagram illustrating a configuration of a learning device according to a first embodiment.

FIG. 1 is a diagram illustrating a configuration of a learning device 10 according to a first embodiment. The learning device 10 according to the first embodiment includes a teacher-network storage unit 22, a student-network storage unit 24, a target data storage unit 26, an initial data storage unit 28, a generation unit 30, an inference unit 32, a training data storage unit 34, and a training unit 36.

The teacher-network storage unit 22 stores teacher network information. The teacher network information is information referred to by an information processing device, for inference according to a teacher neural network and training of the teacher neural network. More specifically, the teacher network information includes the types and configurations of a plurality of layers included in the teacher neural network, the number of nodes in each of the plurality of layers, a connection relationship between the layers, parameters (weight coefficients and bias) set for the plurality of nodes, and the like. Use of the teacher network information enables the information processing device to propagate input data in a forward direction of the teacher neural network and to propagate error data in a backward direction of the teacher neural network.

The student-network storage unit 24 stores student network information. The student network information is information referred to by the information processing device, for inference according to a student neural network and training of the student neural network. More specifically, the student network information includes the types and configurations of a plurality of layers included in the student neural network, the number of nodes in each of the plurality of layers, a connection relationship between the layers, parameters (weight coefficients and bias) set for the plurality of nodes, and the like.

However, the parameters included in the student network information have values (e.g., initial values) before training. Use of the student network information enables the information processing device to propagate input data in a forward direction of the student neural network and propagate error data in a backward direction of the student neural network.

Note that a relationship between the teacher neural network and the student neural network will be described later in detail with reference to FIGS. 2 and 3.

The target data storage unit 26 stores an aimed value set generated in advance by a user. The aimed value set includes information identifying a target layer from among the plurality of layers included in the teacher neural network, information identifying one or more target nodes from among a plurality of nodes included in the target layer, and one or more aimed values corresponding to the one or more target nodes. Each of the one or more aimed values represents a target of a value output from a corresponding target node. Note that the one or more target nodes may be included in the same layer or may be included in different layers.

The target data storage unit 26 may store a plurality of aimed value sets. Each of the plurality of aimed value sets is different from another aimed value set in any of the target layer, one or more target nodes, or one or more aimed values.

For example, the target layer is an output layer included in the teacher neural network. Furthermore, the one or more target nodes are one or more nodes of the output layer included in the teacher neural network. Note that the target layer is not limited to the output layer but may include a hidden layer.

The initial data storage unit 28 stores one or more sets of temporary input data in an initial stage. The temporary input data is data having the same format as input data given to an input layer of the teacher neural network. For example, when the teacher neural network performs image recognition, image data has a predetermined format. When the teacher neural network performs voice recognition, voice data has a predetermined format. When the teacher neural network performs translation and summarization, text data has a predetermined language.

For example, all the temporary input data in an initial stage have the same value. Furthermore, for example, the temporary input data in an initial stage has data generated on the basis of a random number. The temporary input data in an initial stage is generated in advance.

The generation unit 30 acquires teacher network information from the teacher-network storage unit 22. Furthermore, the generation unit 30 acquires one aimed value set from the target data storage unit 26. Furthermore, the generation unit 30 acquires one set of temporary input data in an initial stage from the initial data storage unit 28.

The generation unit 30 generates input data with which a value output from each of the one or more target nodes in a target layer of the plurality of layers included in the teacher neural network may have an aimed value, on the basis of the temporary input data in an initial stage. For example, the generation unit 30 generates input data with which an error between a value output from each of the one or more target nodes in the target layer and an aimed value is equal to or less than a preset value. The generation unit 30 generates input data by a method, for example, described in Karen Simonyan, Andrea Vedaldi, Andrew Zisserman, "Deep Inside Convolutional Networks: Visualising Image Classification Models and Saliency Maps", arXiv:1312.6034, 20 Dec. 2013. In addition, in a case where a plurality of sets of temporary input data is stored in the initial data storage unit 28 and a plurality of aimed value sets are stored in the target data storage unit 26, the generation unit 30 generates input data for each of combinations of the plurality of sets of temporary input data and the aimed value sets. The generation unit 30 supplies the generated input data to the inference unit 32 and the training data storage unit 34. Note that the configuration of the generation unit 30 will be described later in detail with reference to FIG. 4.

The inference unit 32 acquires teacher network information from the teacher-network storage unit 22. Furthermore, the inference unit 32 acquires the input data from the generation unit 30. The inference unit 32 causes the input data to propagate in the forward direction of the teacher neural network to generate output data. In other words, the inference unit 32 gives the input data into the input layer of the teacher neural network and acquires the output data from the output layer of the teacher neural network. Note that when the generation unit 30 generates a plurality of sets of input data, the inference unit 32 causes each of the plurality of sets of input data to propagate in the forward direction of the teacher neural network to generate a plurality of sets of output data corresponding to the plurality of sets of input data. The inference unit 32 supplies the generated output data to the training data storage unit 34.

The training data storage unit 34 stores training data. The training data includes a set of input data and output data that is generated by causing the input data to propagate in the forward direction of the teacher neural network. When the generation unit 30 generates a plurality of sets of input data, the training data storage unit 34 stores a plurality of sets of training data corresponding to the plurality of sets of input data.

The training unit 36 acquires the student network information from the student-network storage unit 24. Furthermore, the training unit 36 acquires training data from the training data storage unit 34. The training unit 36 trains the student neural network by using the training data. The training unit 36 trains the student neural network by using the training data, thereby generating a plurality of parameters (weight coefficient and bias) included in the student neural network. When the training data storage unit 34 stores a plurality of sets of training data, the training unit 36 trains the student neural network by using the plurality of sets of training data. Then, the training unit 36 then outputs a plurality of generated parameters included in the student neural network, to an external device.

Figure 2:
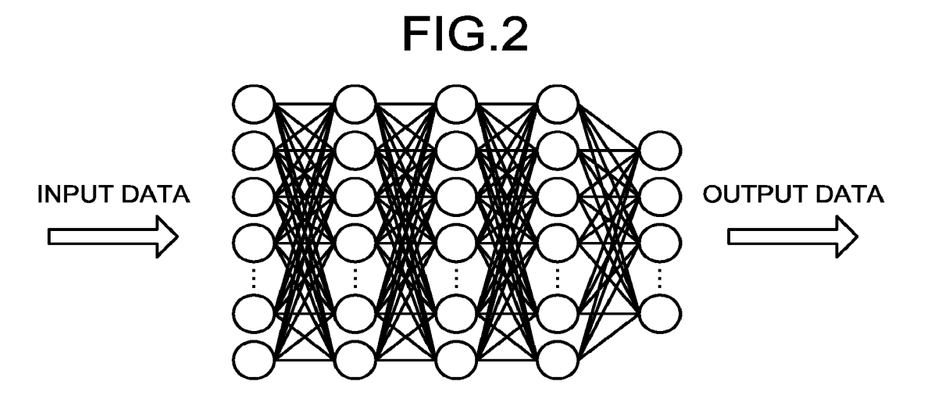
FIG. 2 is a diagram illustrating an example of a teacher neural network.
Figure 3:
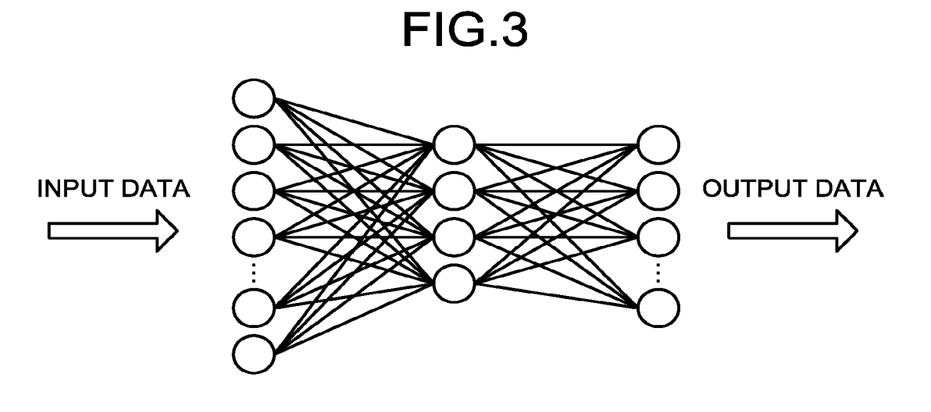
FIG. 3 is a diagram illustrating an example of a student neural network.

FIG. 2 is a diagram illustrating an example of the teacher neural network. FIG. 3 is a diagram illustrating an example of the student neural network.

The student neural network performs the same task as the teacher neural network. For example, the student neural network receives the same type of data as the teacher neural network and outputs the same type of data as the teacher neural network. For example, when the teacher neural network receives image data and outputs an image recognition result, the student neural network also receives the image data and outputs an image recognition result. For example, when the teacher neural network receives voice data and outputs a translation result, the student neural network also receives the voice data and outputs a translation result.

However, the student neural network has a smaller configuration and has a reduced throughput obtained when the student neural network is run by the information processing device, compared with the teacher neural network. Furthermore, the student neural network may have reduced accuracy relative to that of the teacher neural network.

For example, the number of hidden layers of the student neural network may be less than that of hidden layers of the teacher neural network. Furthermore, for example, the number of nodes included in at least one hidden layer in the student neural network may be less than that of nodes included in at least one hidden layer in the teacher neural network. Furthermore, for example, even if the numbers of the hidden layers and nodes of the student neural network are the same as those of the hidden layers and nodes of the teacher neural network, the accuracy of parameters to be set in the student neural network may be lower than that of parameters to be set in the teacher neural network. The accuracy of the parameters to be set is represented by, for example, the numbers of bits of data representing the parameters. Therefore, the information processing device is operable to run the student neural network with a reduced throughput relative to that required for running the teacher neural network.

Figure 4:
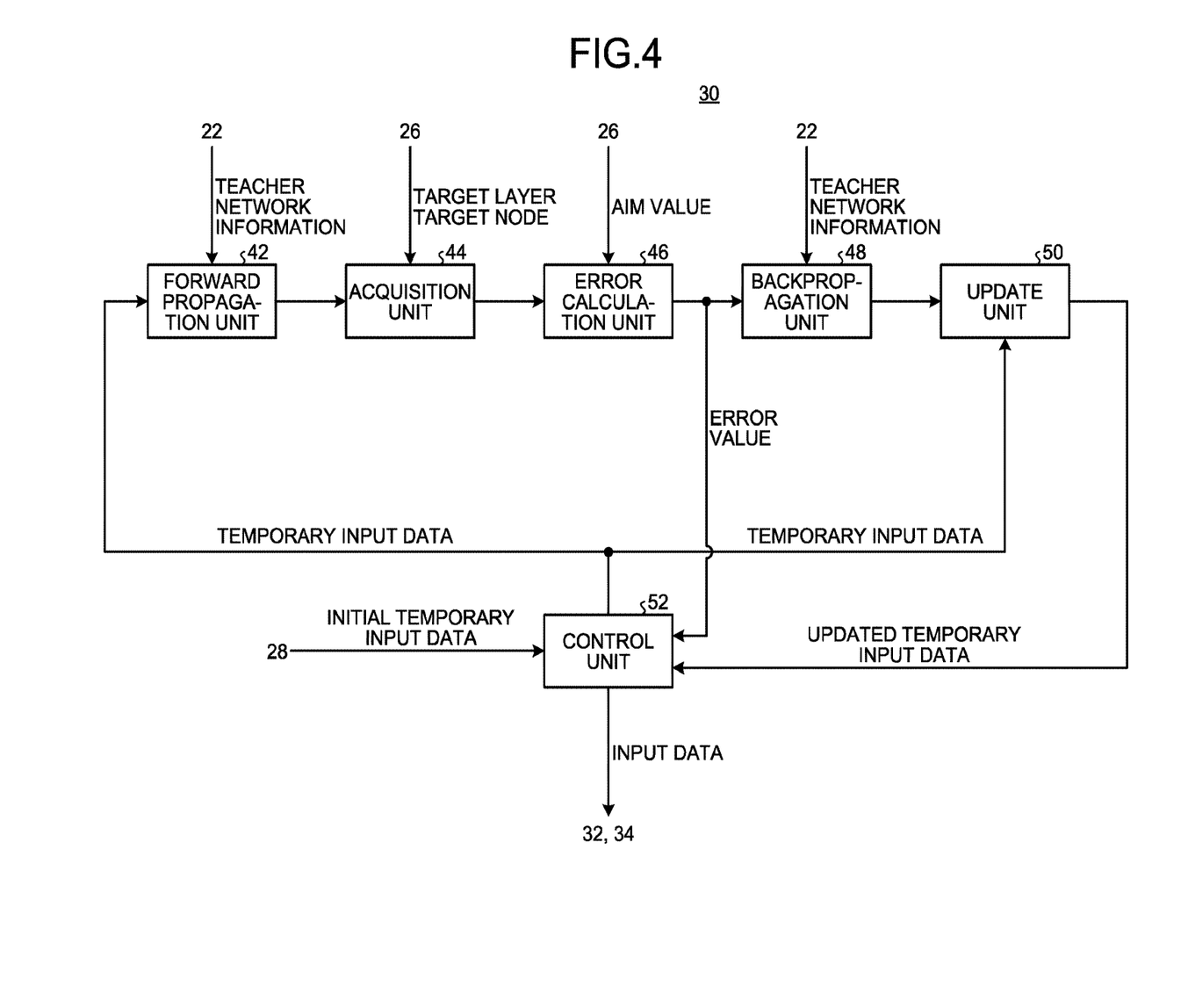
FIG. 4 is a diagram illustrating a configuration of a generation unit.

FIG. 4 is a diagram illustrating a configuration of the generation unit 30. The generation unit 30 includes a forward propagation unit 42, an acquisition unit 44, an error calculation unit 46, a backpropagation unit 48, an update unit 50, and a control unit 52.

The forward propagation unit 42 acquires teacher network information from the teacher-network storage unit 22 in advance. Furthermore, the forward propagation unit 42 acquires temporary input data from the control unit 52. The forward propagation unit 42 then performs forward propagation processing of generating temporary output data by causing the acquired temporary input data to propagate in a forward direction of the teacher neural network.

The acquisition unit 44 acquires information identifying a target layer and information identifying one or more target nodes, both of the information being included in an aimed value set in advance, from the target data storage unit 26. The acquisition unit 44 performs acquisition processing of acquiring a value output from each of one or more target nodes in the forward propagation processing performed by the forward propagation unit 42. Then, the acquisition unit 44 supplies the value output from each of the one or more target nodes to the error calculation unit 46.

The error calculation unit 46 acquires from the target data storage unit 26, an aimed value for each of the one or more target nodes included in the aimed value set in advance. Then, the error calculation unit 46 performs error calculation processing of calculating an error value representing an error between a value output from a corresponding target node in the forward propagation processing and a corresponding aimed value, for each of the one or more target nodes. For example, the error calculation unit 46 gives the value output from a corresponding target node and the corresponding aimed value to a predetermined error function to calculate the error value. The error calculation unit 46 supplies an error value for each of the one or more target nodes, to the backpropagation unit 48 and the control unit 52.

The backpropagation unit 48 acquires teacher network information from the teacher-network storage unit 22 in advance. The backpropagation unit 48 performs backpropagation processing of generating input error data representing an error included in the temporary input data by causing the error value for each of the one or more target nodes to propagate in the backward direction of the teacher neural network. The backpropagation unit 48 supplies the input error data to the update unit 50.

For example, in the backpropagation processing, the backpropagation unit 48 causes each of the one or more error values to propagate in the backward direction of the teacher neural network from a corresponding target node. Then, the backpropagation unit 48 outputs synthetic data of values output from the input layer of the teacher neural network as the input error data by causing the one or more error values to propagate backward.

Note that in the present embodiment, the backpropagation unit 48 does not update a plurality of parameters set to the teacher neural network. In other words, the backpropagation unit 48 fixes the plurality of parameters in the backpropagation processing.

The update unit 50 acquires the temporary input data having been propagated forward in the last forward propagation processing. The update unit 50 performs update processing of updating the acquired temporary input data on the basis of the input error data. For example, the update unit 50 updates the acquired temporary input data so as to reduce the error included in the temporary input data. For example, the update unit 50 may subtract the input error data from the acquired temporary input data. The update unit 50 supplies the updated temporary input data to the control unit 52.

The control unit 52 performs control processing causing the forward propagation processing, acquisition processing, error calculation processing, backpropagation processing, and update processing to be repeatedly performed until reaching a predetermined state. In addition, every time the process is repeated, the control unit 52 supplies the temporary input data to the forward propagation unit 42 and acquires the updated temporary input data from the update unit 50.

More specifically, the control unit 52 supplies temporary input data in an initial stage, acquired from the initial data storage unit 28, to the forward propagation unit 42, in the first process. Accordingly, the forward propagation unit 42 propagates the temporary input data in an initial stage, in the forward direction of the teacher neural network, in the first forward propagation processing.

In addition, in the second and subsequent processes, the control unit 52 supplies updated temporary input data acquired from the update unit 50 in the last process, to the forward propagation unit 42. Accordingly, the forward propagation unit 42 propagates the updated temporary input data updated in the last update processing, through in the forward direction of the teacher neural network, in the second and subsequent forward propagation processing.

Furthermore, when reaching a predetermined state, the control unit 52 outputs, as the input data, the temporary input data updated in the last update processing. The predetermined state represents, for example, a state in which an error evaluation value is equal to or less than a reference value. For example, the error evaluation value is a value obtained by adding the magnitude of an error between a value output from a target node and a corresponding aimed value as many times as the number of the one or more target nodes (i.e., by summing the magnitude of each error for the one or more target nodes, where the error is an error between a value output from a target node and a corresponding aimed value). Note that the evaluation value for error calculation may employ any value as long as the value is an index representing the magnitude of the error included in the temporary input data.

Then, the control unit 52 supplies the input data to the inference unit 32 and the training data storage unit 34.

Figure 5:
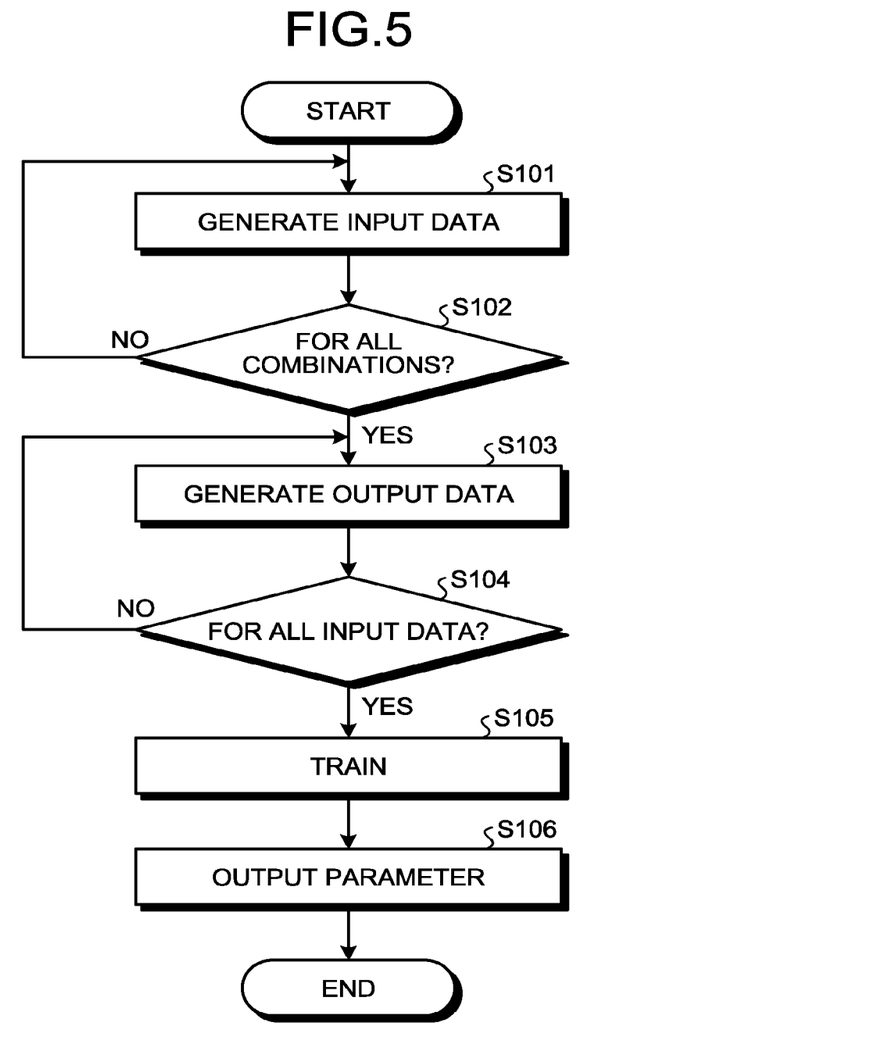
FIG. 5 is a flowchart illustrating a process performed by a learning device.

FIG. 5 is a flowchart illustrating a process performed by the learning device 10. The learning device 10 performs a process as illustrated in FIG. 5.

Firstly, in S101, the learning device 10 generates one set of input data on the basis of one set of temporary input data in an initial stage of a plurality of sets of temporary input data in an initial stage stored in the initial data storage unit 28 and one aimed value set of a plurality of aimed value sets stored in the target data storage unit 26. Note that the processing of S101 will be described later in detail with reference to FIG. 6.

Next, in S102, the learning device 10 determines whether input data have been generated for all combinations of the temporary input data in an initial stage and the aimed value set. If no input data is generated for a combination (No in S102), the learning device 10 returns the process to S101 and generates input data for a new combination. If input data are generated for all combinations (Yes in S102), the learning device 10 advances the process to S103.

In S103, the learning device 10 generates output data by using the teacher neural network, on the basis of one set of input data of the plurality of generated sets of input data. The learning device 10 stores the original input data and the generated output data in a pair, as training data.

Next, in S104, the learning device 10 determines whether output data have been generated for all of the plurality of generated sets of input data. If no output data is generated for some input data (No in S104), the learning device 10 returns the process to S103 and generates output data for new input data. If output data are generated for all input data (Yes in S104), the learning device 10 advances the process to S105.

Next, in S105, the learning device 10 trains a student neural network by using the plurality of generated sets of training data. Then, in S106, the learning device 10 outputs a parameter included in the student neural network, obtained by training the student neural network. If the processing of S106 ends, the learning device 10 finishes the present process.

Figure 6:
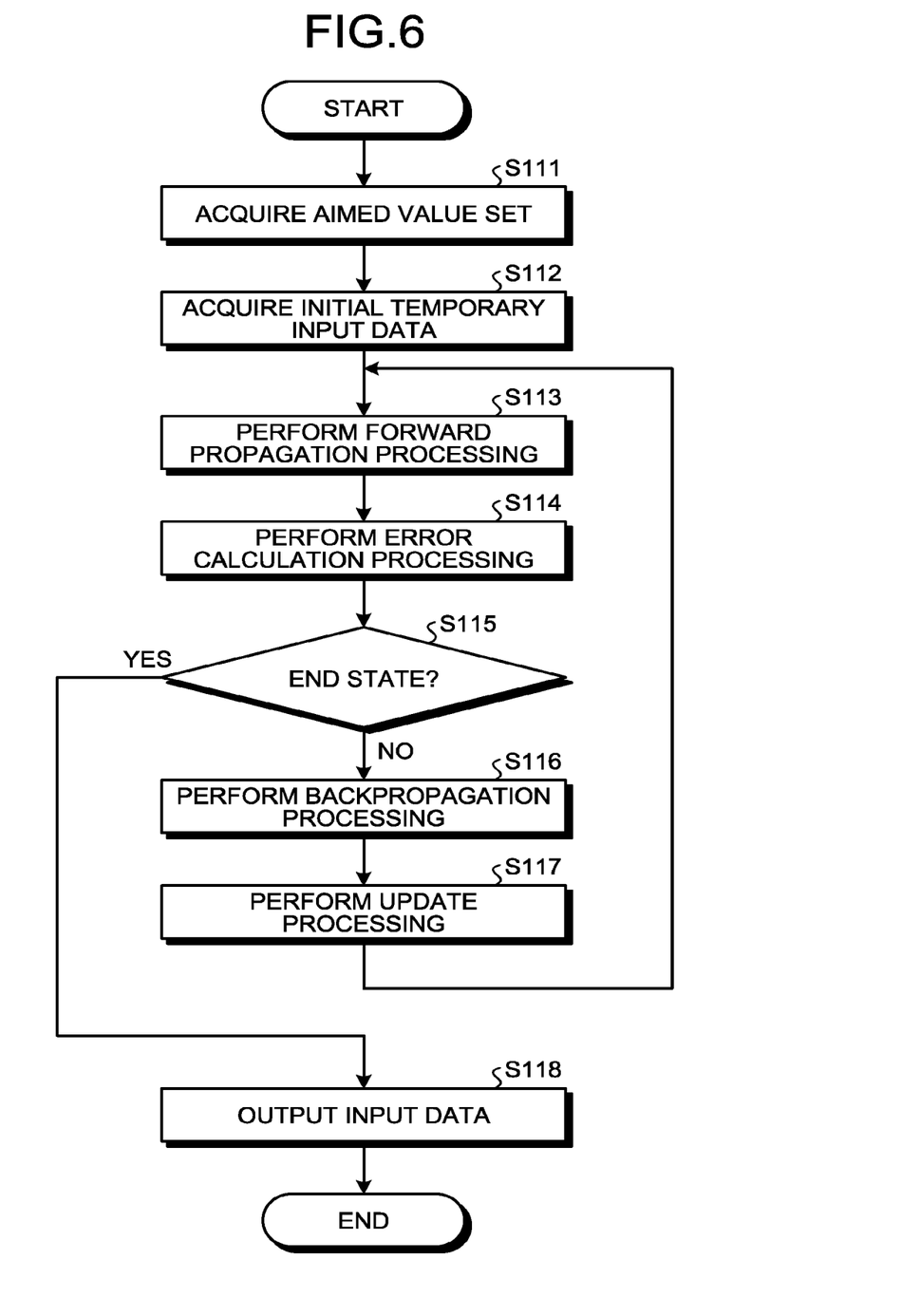
FIG. 6 is a flowchart illustrating an input data generation process.

FIG. 6 is a flowchart illustrating an input data generation process. In S101 of FIG. 5, the generation unit 30 of the learning device 10 performs the process according to the procedure illustrated in FIG. 6.

Firstly, in S111, the generation unit 30 acquires one aimed value set from the target data storage unit 26. The aimed value set includes information identifying a target layer, information identifying one or more target nodes of a plurality of nodes included in the target layer, and an aimed value corresponding to a value output from each of the one or more target nodes.

Nest, in S112, the generation unit 30 acquires one temporary input data in an initial stage from the initial data storage unit 28. Then, in S113, the generation unit 30 performs forward propagation processing. More specifically, the generation unit 30 causes the acquired temporary input data to propagate in a forward direction of a teacher neural network to generate temporary output data.

Then, in S114, the generation unit 30 performs error calculation processing. More specifically, the generation unit 30 calculates an error value representing an error between a value output from a corresponding target node in the forward propagation processing and a corresponding aimed value, for each of the one or more target nodes.

Next, in S115, the generation unit 30 determines whether the generation unit 30 has reached a predetermined end state. For example, when the error evaluation value is equal to or less than the reference value, the generation unit 30 determines that the generation unit 30 has reached the end state. If the generation unit 30 has not yet reached the end state (No in S115), the process proceeds to S116.

In S116, the generation unit 30 performs backpropagation processing. More specifically, the generation unit 30 causes an error value for each of the one or more target nodes to propagate in the backward direction of the teacher neural network to generate input error data.

Then, in S117, the generation unit 30 performs update processing. More specifically, the generation unit 30 updates the temporary input data on the basis of the input error data so as to reduce the error included in the temporary input data. For example, the generation unit 30 subtracts the input error data from the temporary input data to update the temporary input data.

When the process of S117 is finished, the generation unit 30 returns the process to S113. Then, the generation unit 30 repeatedly performs the process from S113, on the basis of the updated temporary input data.

Furthermore, if the generation unit 30 reaches the end state (Yes in S115) as a result of repeated performance of the forward propagation processing (S113), error calculation processing (S114), backpropagation processing (S116), and update processing (S117), the generation unit 30 breaks loop processing from S113 to S117 and advances the process to S118.

In S118, the generation unit 30 outputs, as the input data, the temporary input data updated in the last update processing. If the processing of S118 ends, the generation unit 30 finishes the present process.

Figure 7:
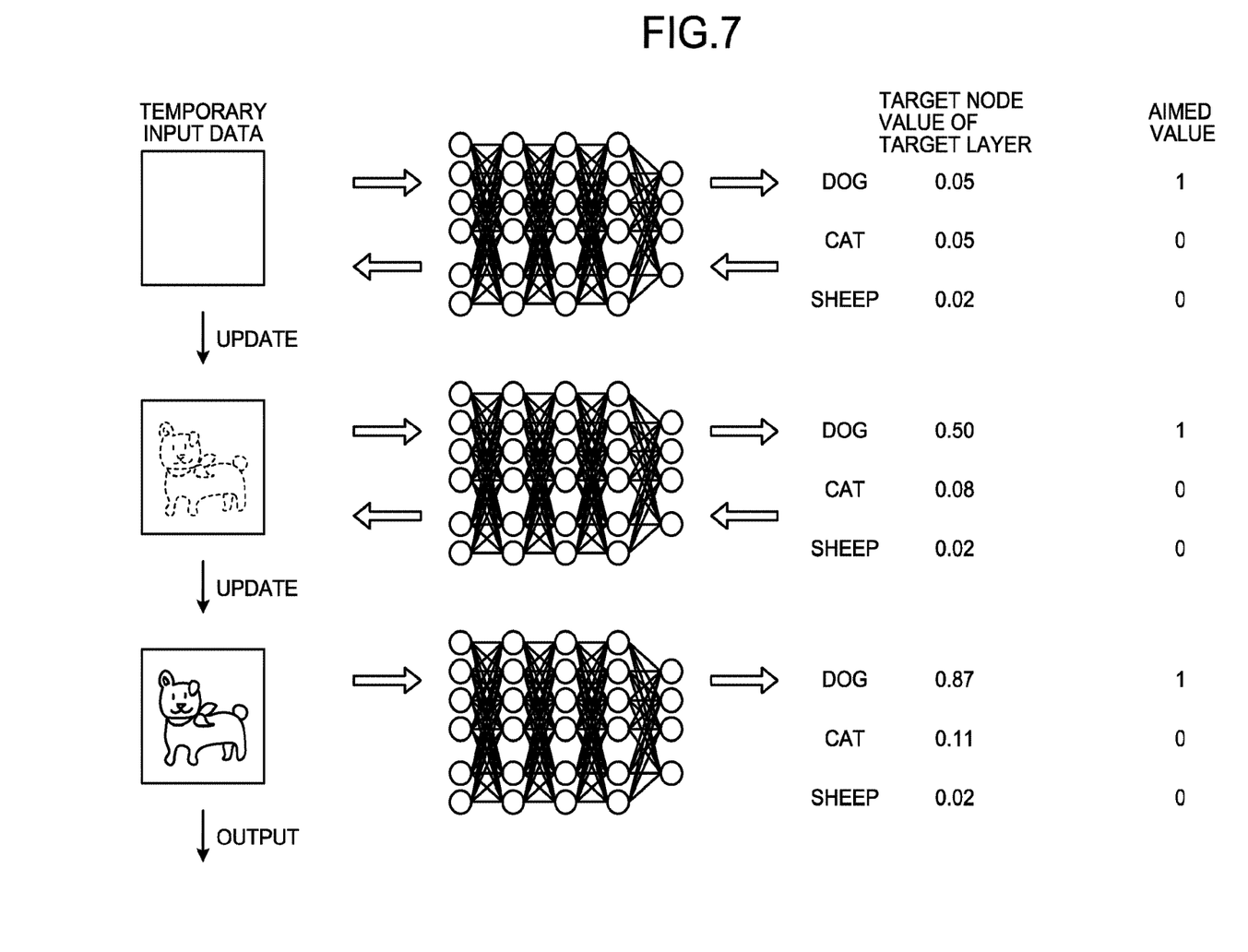
FIG. 7 is a diagram for illustrating update of temporary input data.

FIG. 7 is a diagram for illustrating update of temporary input data. All the temporary input data in an initial stage, for example, have the same value, or have data generated on the basis of a random number.

The temporary input data is gradually updated every time the generation unit 30 performs the forward propagation processing, error calculation processing, backpropagation processing, and update processing. As a result of repeated performance of the forward propagation processing, error calculation processing, backpropagation processing, and update processing, the error evaluation value indicating an error between a value output from a target node and an aimed value becomes equal to or less than the reference value. The temporary input data updated until the evaluation value becomes equal to or lower than the reference value in this way can be used as the training data for training the student neural network.

As described above, the learning device 10 according to the first embodiment is configured to generate the training data for training the student neural network performing the same task as the teacher neural network according to information processing. Thus, the learning device 10 according to the first embodiment is operable to train the student neural network with reduced workload.

Second Embodiment

Figure 8:
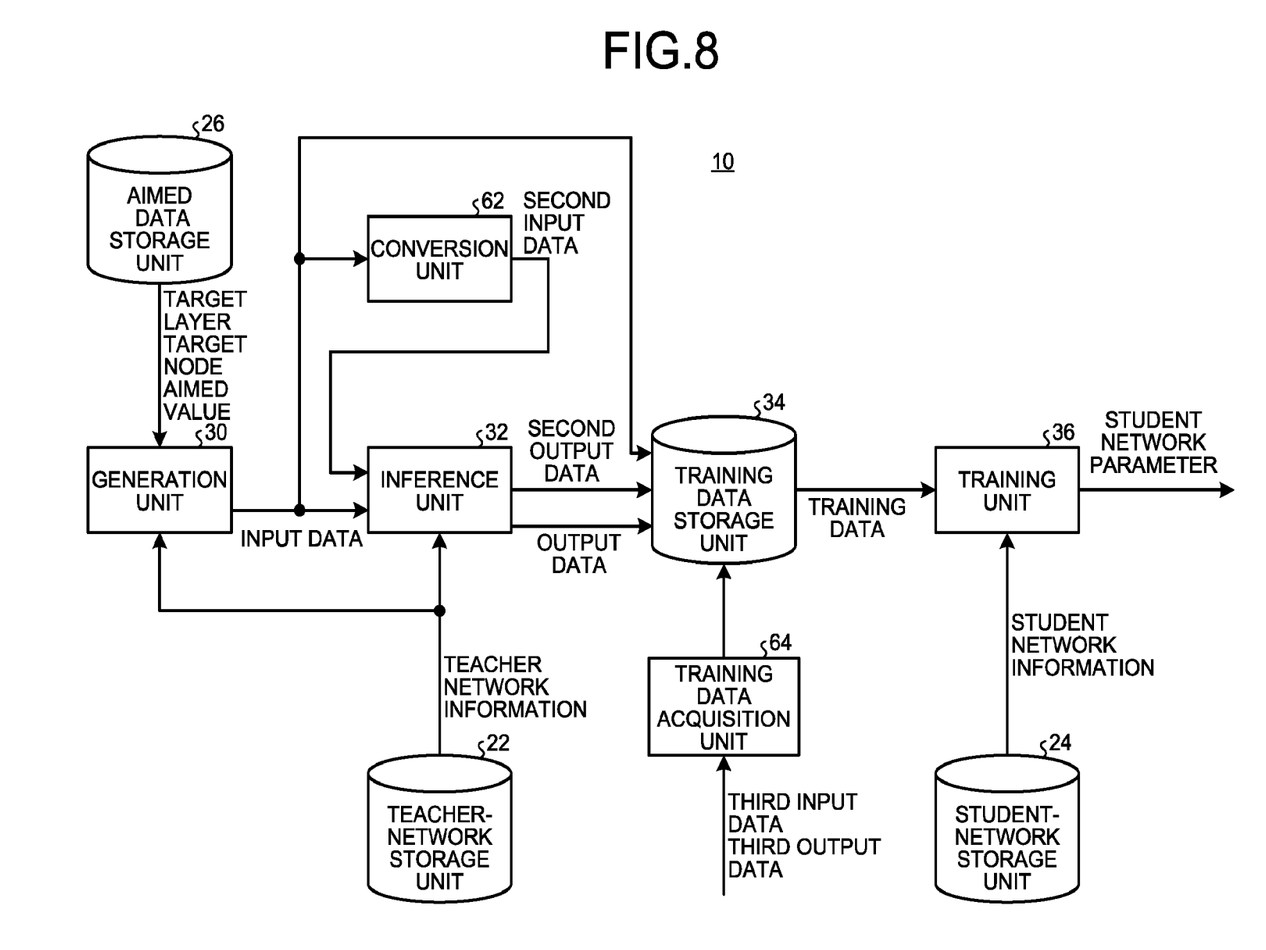
FIG. 8 is a diagram illustrating a configuration of a learning device according to a second embodiment.

FIG. 8 is a diagram illustrating a configuration of a learning device 10 according to a second embodiment. The learning device 10 according to the second embodiment has a configuration and function substantially the same as the learning device 10 according to the first embodiment. Therefore, in the description of the learning device 10 according to the second embodiment, units having substantially the same configurations and functions as those in the first embodiment are denoted by the same reference numerals, and detailed description thereof is omitted except for differences.

The learning device 10 according to the second embodiment further includes a conversion unit 62. The conversion unit 62 generates second input data by performing a conversion process on input data generated by the generation unit 30.

For example, the conversion unit 62 performs a geometric deformation process as the conversion process. More specifically, when the input data is image data, the conversion unit 62 performs enlargement processing, reduction processing, rotation processing, inversion processing, clipping processing, or the like. The conversion unit 62 supplies the generated second input data to the inference unit 32 and the training data storage unit 34.

The inference unit 32 acquires the second input data from the conversion unit 62. The inference unit 32 causes the second input data to propagate in the forward direction of the teacher neural network to generate second output data. The inference unit 32 supplies the generated second output data to the training data storage unit 34.

The training data storage unit 34 further stores second training data. The second training data includes a set of second input data and second output data that is generated by causing the second input data to propagate in the forward direction of the teacher neural network.

The training unit 36 trains the student neural network by using the second training data in addition to the training data. Then, the training unit 36 outputs a plurality of parameters included in the student neural network, the parameters being generated by training using the training data and the second training data.

As described above, the learning device 10 according to the second embodiment is configured to train the student neural network by further using the second training data. Thus, the learning device 10 according to the second embodiment is operable to train the student neural network so that estimation processing can be performed with higher accuracy.

Furthermore, the learning device 10 according to the second embodiment may further include a training data acquisition unit 64. The training data acquisition unit 64 acquires third training data including a set of third input data and third output data, the third training data being used for training of the teacher neural network, for example, from an external device. Then, the training data acquisition unit 64 supplies the third training data to the training data storage unit 34.

The training data storage unit 34 further stores the third training data. The training unit 36 trains the student neural network by further using the third training data in addition to the training data and second training data. Then the training unit 36 outputs a plurality of parameters included in the student neural network, the parameters being generated by training using the training data, second training data, and third training data.

As described above, the learning device 10 according to the second embodiment is configured to train the student neural network by further using the third training data having been used for training the teacher neural network. Thus, the learning device 10 according to the second embodiment is operable to train the student neural network so that estimation processing can be performed with higher accuracy.

Hardware Configuration

Figure 9:
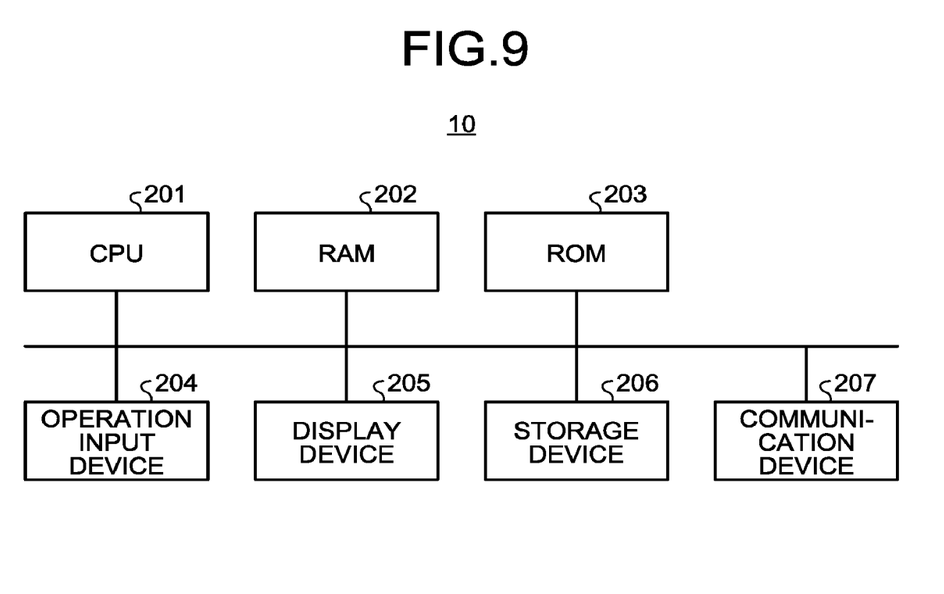
FIG. 9 is a diagram illustrating an exemplary hardware configuration of a learning device.

FIG. 9 is a diagram illustrating an exemplary hardware configuration of a learning device 10 according to an embodiment. The learning device 10 according to the present embodiment is achieved by an information processing device having a hardware configuration, for example, as illustrated in FIG. 9. The learning device 10 includes a central processing unit (CPU) 201, a random access memory (RAM) 202, a read only memory (ROM) 203, an operation input device 204, a display device 205, a storage device 206, and a communication device 207. These units are connected by a bus.

The CPU 201 is a processor configured to perform calculation processing, control processing, or the like according to a program. The CPU 201 performs various processing in cooperation with a programs stored in the ROM 203, the storage device 206, and the like, with a predetermined area of the RAM 202 as a work area.

The RAM 202 includes a memory such as a synchronous dynamic random access memory (SDRAM). The RAM 202 functions as a work area for the CPU 201. The ROM 203 includes a memory configured to store programs and various types of information in a non-rewritable manner.

The operation input device 204 includes an input device such as a mouse and a keyboard. The operation input device 204 receives information input from the user as an instruction signal and outputs the instruction signal to the CPU 201.

The display device 205 includes a display device such as a liquid crystal display (LCD). The display device 205 displays various information on the basis of a display signal from the CPU 201.

The storage device 206 is a device configured to write and read data to and from a semiconductor storage medium such as a flash memory or a magnetically or optically recordable storage medium, or the like. The storage device 206 writes and reads data to and from the storage medium according to control from the CPU 201. The communication device 207 communicates with an external device via a network according to control from the CPU 201.

A program executed by the learning device 10 according to the present embodiment has a module configuration including a generation module, an inference module, and a training module. This program is deployed and executed on the RAM 202 by the CPU 201 (processor) to cause the information processing device to function as the generation unit 30, the inference unit 32, and the training unit 36. Furthermore, this program causes the RAM 202 and the storage device 206 to function as the teacher-network storage unit 22, the student-network storage unit 24, the target data storage unit 26, the initial data storage unit 28, and the training data storage unit 34.

Note that the learning device 10 is not limited to such a configuration and may have a configuration in which the generation unit 30, the inference unit 32, and the training unit 36 are at least partially achieved by a hardware circuit (e.g., a semiconductor integrated circuit).

The program executed by the learning device 10 according to the present embodiment has a file format installable in a computer or executable by the computer and is supplied by being recorded on a computer-readable recording medium, such as a CD-ROM, flexible disk, CD-R, or digital versatile disk (DVD).

Furthermore, the program executed by the learning device 10 according to the present embodiment may be configured to be stored on a computer connected to a network such as the Internet so as to be provided by being downloaded via the network. Furthermore, the program executed by the learning device 10 according to the present embodiment may be configured to be provided or distributed via a network such as the Internet. Furthermore, the program executed by the learning device 10 may be configured to be provided by being incorporated in advance in the ROM 203 or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
one or more hardware processors configured to function as:
a generation unit configured to generate input data with which an error between a value output from each of one or more target nodes and a preset aimed value is equal to or less than a preset value, the target nodes being in a target layer of a plurality of layers included in a first neural network;
an inference unit configured to acquire output data that is output from an output layer of the first neural network by causing the input data to propagate from an input layer of the first neural network in a forward direction; and
a training unit configured to train a second neural network differing from the first neural network by using training data including a set of the input data and the output data, wherein
the generation unit is configured to perform:
forward propagation processing of acquiring temporary output data that is output from the output layer of the first neural network by causing temporary input data to propagate from the input layer of the first neural network in the forward direction;
error calculation processing of calculating an error value representing an error between a value output from a corresponding target node in the forward propagation processing and the aimed value corresponding to the target node, for each of the one or more target nodes;
backpropagation processing of acquiring input error data that is output from the input layer of the first neural network by causing the error value of each of the one or more target nodes to propagate from the each of the one or more target nodes in the first neural network in a backward direction;
update processing of updating the temporary input data on the basis of the input error data; and
control processing of repeatedly performing the forward propagation processing, the error calculation processing, the backpropagation processing, and the update processing until reaching a predetermined state, wherein
the generation unit causes the temporary input data in an initial stage to propagate in the forward direction of the first neural network, in the forward propagation processing performed for the first time and causes the temporary input data having been updated in the update processing performed immediately before to propagate in the forward direction of the first neural network in the second and subsequent forward propagation processing, and
when the generation unit reaches the predetermined state, the generation unit outputs the temporary input data updated in the update processing performed immediately before, as the input data.

2. The learning device according to claim 1, wherein the target layer is the output layer included in the first neural network.

3. The learning device according to claim 1, wherein
for each of the one or more target nodes, the aimed value is set individually, and
the generation unit generates the input data with which an error between a value output from each of the one or more target nodes in the target layer and the aimed value corresponding to the target node is equal to or less than the preset value.

4. The learning device according to claim 1, wherein
the predetermined state is a state in which an error evaluation value is equal to or less than a reference value, and
the error evaluation value is a value obtained by summing a magnitude of an error for the one or more target nodes and between a value output from a target node and the aimed value corresponding to the target node.

5. The learning device according to claim 1, wherein
all the temporary input data in an initial stage, acquired in the forward propagation processing performed for the first time, have a same value.

6. The learning device according to claim 1 wherein
the temporary input data in an initial stage acquired in the forward propagation processing performed for the first time has data generated on the basis of a random number.

7. The learning device according to claim 1, wherein
the second neural network receives the same type of data as the first neural network and outputs the same type of data as the first neural network.

8. The learning device according to claim 7, wherein
in the second neural network, the number of hidden layers is less than that of hidden layers in the first neural network.

9. The learning device according to claim 7, wherein
in the second neural network, the number of nodes included in at least one hidden layer is less than that of nodes included in at least one hidden layer in the first neural network.

10. The learning device according to claim 7, wherein
in the second neural network in which a parameter has low accuracy including the small number of bits, accuracy in parameter to be set is lower than that in the first neural network.

11. The learning device according to claim 1, wherein the one or more hardware processors are configured to further function as:
a conversion unit configured to generate second input data by performing conversion processing on the input data, wherein
the inference unit further generates second output data by causing the second input data to propagate in the forward direction of the first neural network, and
the training unit trains the second neural network by using second training data including a set of the second input data and the second output data in addition to the training data.

12. The learning device according to claim 1, wherein the one or more hardware processors are configured to further function as:
a training data acquisition unit configured to acquire third training data including a set of third input data and third output data having been used in training of the first neural network, wherein
the training unit trains the second neural network by further using the third training data in addition to the training data.

13. A learning method performed by an information processing device, the method comprising:
generating, by a generation unit, input data with which an error between a value output from each of one or more target nodes and a preset aimed value is equal to or less than a preset value, the target nodes being in a target layer of a plurality of layers included in a first neural network;

acquiring, by an inference unit, output data that is output from an output layer of the first neural network by causing the input data to propagate from an input layer of the first neural network in a forward direction; and training, by a training unit, a second neural network differing from the first neural network by using training data including a set of the input data and the output data, wherein the generating includes:

forward propagation processing of acquiring temporary output data that is output from the output layer of the first neural network by causing temporary input data to propagate from the input layer of the first neural network in the forward direction;

error calculation processing of calculating an error value representing an error between a value output from a corresponding target node in the forward propagation processing and the aimed value corresponding to the target node, for each of the one or more target nodes;

backpropagation processing of acquiring input error data that is output from the input layer of the first neural network by causing the error value of each of the one or more target nodes to propagate from the each of the one or more target nodes in the first neural network in a backward direction;

update processing of updating the temporary input data on the basis of the input error data; and control processing of repeatedly performing the forward propagation processing, the error calculation processing, the backpropagation processing, and the update processing until reaching a predetermined state, wherein the generating includes causing the temporary input data in an initial stage to propagate in the forward direction of the first neural network, in the forward propagation processing performed for the first time and causing the temporary input data having been updated in the update processing performed immediately before to propagate in the forward direction of the first neural network in the second and subsequent forward propagation processing, and when the generation unit reaches the predetermined state, the generating includes outputting the temporary input data updated in the update processing performed immediately before, as the input data.

14. A computer program product having a non-transitory computer readable medium including instructions stored thereon for causing an information processing device to function as a learning device, wherein the instructions cause the information processing device to function as:

a generation unit configured to generate input data with which an error between a value output from each of one or more target nodes and a preset aimed value is equal to or less than a preset value, the target nodes being in a target layer of a plurality of layers included in a first neural network;

an inference unit configured to acquire output data that is output from an output layer of the first neural network by causing the input data to propagate from an input layer of the first neural network in a forward direction; and a training unit configured to train a second neural network differing from the first neural network by using training data including a set of the input data and the output data, wherein the generation unit is configured to perform:

forward propagation processing of acquiring temporary output data that is output from the output layer of the first neural network by causing temporary input data to propagate from the input layer of the first neural network in the forward direction;

error calculation processing of calculating an error value representing an error between a value output from a corresponding target node in the forward propagation processing and the aimed value corresponding to the target node, for each of the one or more target nodes;

backpropagation processing of acquiring input error data that is output from the input layer of the first neural network by causing the error value of each of the one or more target nodes to propagate from the each of the one or more target nodes in the first neural network in a backward direction;

update processing of updating the temporary input data on the basis of the input error data; and control processing of repeatedly performing the forward propagation processing, the error calculation processing, the backpropagation processing, and the update processing until reaching a predetermined state, wherein the generation unit causes the temporary input data in an initial stage to propagate in the forward direction of the first neural network, in the forward propagation processing performed for the first time and causes the temporary input data having been updated in the update processing performed immediately before to propagate in the forward direction of the first neural network in the second and subsequent forward propagation processing, and when the generation unit reaches the predetermined state, the generation unit outputs the temporary input data updated in the update processing performed immediately before, as the input data.

* * * * *